Feb. 1, 1927.
G. HAMERSLEY
1,616,417
CULTIVATOR ATTACHMENT
Filed Sept. 30, 1924
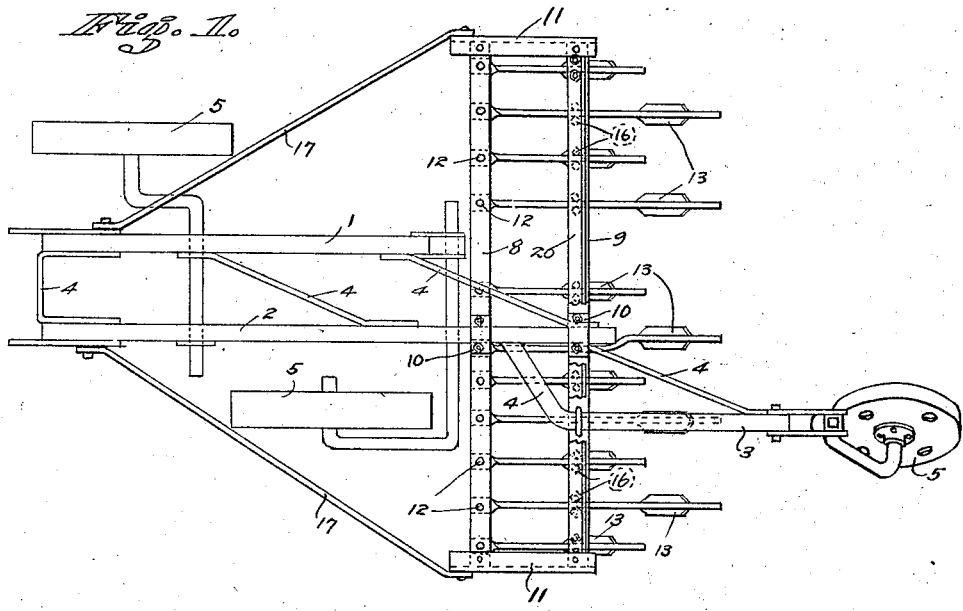
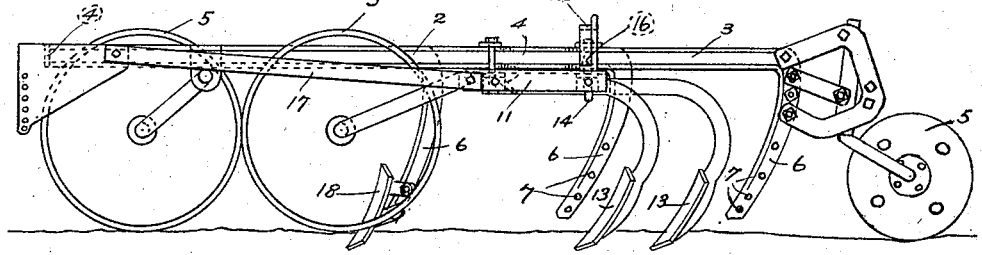
Inventor
GARVIN HAMERSLEY
By
Attorneys Patented Feb. 1, 1927.

1,616,417

UNITED STATES PATENT OFFICE.

GARVIN HAMERSLEY, OF GEYSERVILLE, CALIFORNIA, ASSIGNOR OF ONE-HALF TO OSCAR W. TEABY, OF GEYSERVILLE, CALIFORNIA.

CULTIVATOR ATTACHMENT.

Application filed September 30, 1924. Serial No. 740,761.

The present invention relates to improvements in cultivating implements and has particular reference to a combination plow and cultivator. It is particularly proposed, in the present invention, to provide a cultivator attachment for a multiple gang plow in such a manner that the cultivator attachment is directly fixed to the gang plow, after the plow shares have been removed, so that the whole implement then becomes a cultivator arranged to be manipulated in the same manner as the gang plow. The ordinary gang plow, as now commonly used for cultivation of large acreage, includes a plurality of longitudinal frame members fixed to one another and arranged in parallel relation and supported relative to a pair of wheels in such a manner that the position of the frame relative to the wheels can be adjusted by means of a lever arrangement for the purpose of adjusting the depth to which the land is to be plowed. My cultivator attachment is particularly designed to be secured directly to the longitudinal frame members of the plow after the plow shares have been removed, so that the cultivator thereafter enjoys all the advantages of the gang plow. Further objects and advantages of my invention will appear as the specification proceeds.

The preferred form of the invention is illustrated in the accompanying drawing in which Figure 1 shows a top plan view of a three gang plow having my cultivator attachment secured thereto, with the lever arrangement omitted for the sake of clearness and Figure 2 a side view of the same arrangement. While I have shown only the preferred form of the invention, it should be understood that various changes or modifications may be made within the scope of the claims hereto attached without departing from the spirit of the invention.

The three longitudinal frame members 1, 2 and 3 are held in fixed and parallel relation to one another by means of suitable braces 4 and are supported on the wheels 5. A suitable lever arrangement, well known in the art and not shown in the drawing, is used to adjust the relative height and position of the frame members as compared with the wheels. Of the three members, the second one is longer than the first one and extends further rearwardly, and the third one is longer than the second one, extending still further rearwardly. The three frame members are bent downwardly to terminate in stumps 6 adapted to have the moldboards for the plow shares attached thereto by means of bolts extending through the perforations 7.

My invention consists in the cultivator attachment which comprises in its principal features the two transverse bars 8 and 9 joined at their ends by the bars 11 and secured to the longitudinal members 2 and 3 in such a manner as to lie flat on top of the plow in transverse relation thereto. The bar 8 has a plurality of standards secured thereto as shown at 12, standards extending rearwardly through a certain distance and then bent downwardly so that the cultivating tools 13 secured to the extremities thereof are in operative engagement with the ground surface. Intermediate portions of the standards are secured to the second transverse bar 9 by means of U-shaped clamps 14 straddling the standards and extending into the bar 9 and held in place by means of nuts 16. The two bars 8 and 9 are fastened to the longitudinal frame members by means of clamps 10. The frame formed of the bars 8, 9 and 11 is secured to the longitudinal frame members 1 and 2 by the braces 17 leading from the forward edges of the frame to the front ends of the members 1 and 2, and a yoke shaped member 20 is stretched over the bar 9 for reinforcing the latter. Where the cultivating teeth are in line with the stumps of the plow frame, the latter may be used for supporting a cultivating tool as shown at 18.

The advantages of my attachment are apparent. It allows a multiple gang plow to be changed into a cultivating implement in a very short period of time. All that is necessary is to remove the moldboards from the stumps of the plow frame and to secure the cultivator attachment by placing the same on top of the longitudinal frame members and then fastening it in place by means of the clamps 10 and the braces 17. The cultivator may thereupon be manipulated in the same manner as a plow, and its teeth may be raised and lowered by means of the regular lever arrangement not shown in the drawing.

I claim:

An attachment for a multiple gang plow having vertically adjustable parallel frame members comprising a transverse bar rigidly and detachably secured to one of the frame members and movable vertically therewith, standards of different lengths rigidly secured to said bar and extending rearwardly therefrom for different distances and bent downwardly for operative engagement with the ground surface and a second bar secured to the said frame member rearwardly of the first bar and in parallel relation thereto, said second bar being rigidly secured to the rearwardly extending portion of the said standards, and a yoke extending across the second bar for reinforcing the same.

GARVIN HAMERSLEY.